(12) United States Patent
Lin et al.

(10) Patent No.: US 8,228,672 B2
(45) Date of Patent: Jul. 24, 2012

(54) COMPUTER ENCLOSURE INCLUDING AIR GUIDE MEMBERS

(75) Inventors: Meng-Hsien Lin, Taipei Hsien (TW); Yu-Chia Lai, Taipei Hsien (TW); Yao-Ting Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 182 days.

(21) Appl. No.: 12/755,430

(22) Filed: Apr. 7, 2010

(65) Prior Publication Data
US 2011/0069438 A1    Mar. 24, 2011

(30) Foreign Application Priority Data
Sep. 21, 2009    (CN) .......................... 2009 1 0307387

(51) Int. Cl.
*H05K 7/20* (2006.01)
*H05K 5/00* (2006.01)
*A47B 77/08* (2006.01)

(52) U.S. Cl. .............. 361/679.49; 361/695; 361/679.33; 454/184; 312/236

(58) Field of Classification Search .. 361/679.48–679.5, 361/679.33, 679.37–679.39, 694, 695; 454/184; 165/80.2; 174/547; 312/223.1, 236
See application file for complete search history.

(56) References Cited

U.S. PATENT DOCUMENTS

| | | | |
|---|---|---|---|
| 6,086,476 A * | 7/2000 | Paquin et al. ................. | 454/184 |
| 7,123,478 B2 * | 10/2006 | Chen ............................ | 361/695 |
| 7,583,497 B2 * | 9/2009 | Roesner ................... | 361/679.33 |
| 2002/0041484 A1 * | 4/2002 | Lajara et al. ................. | 361/687 |
| 2008/0239664 A1 * | 10/2008 | Sun et al. ...................... | 361/692 |
| 2011/0249390 A1 * | 10/2011 | Xie et al. ................. | 361/679.33 |

* cited by examiner

*Primary Examiner* — Zachary M Pape
(74) *Attorney, Agent, or Firm* — Altis Law Group, Inc.

(57) ABSTRACT

An exemplary computer enclosure includes a chassis, a mounting frame, two air-guiding members, and a fan. The chassis includes a first side panel, a second side panel, and a ventilation area defining ventilation through holes. The mounting frame is fixed to the chassis and faces the ventilation through holes. The mounting frame is configured for receiving electronic components. The two air-guiding members respectively connect two opposite sides of the mounting frame to the chassis. The two air-guiding members incline relative to the mounting frame and the chassis to form an air passage. The fan is configured for exhausting air passing through the ventilation through holes and the mounting frame. The two air-guiding members and the first and second side panels cooperatively surround the ventilation area to allow the air to enter the chassis from the ventilation area and allow all of the air to pass through the mounting frame.

20 Claims, 3 Drawing Sheets

COMPUTER ENCLOSURE INCLUDING AIR GUIDE MEMBERS

BACKGROUND

1. Technical Field

The present disclosure relates to computer enclosures and, particularly, to a computer enclosure with effective heat dissipation.

2. Description of Related Art

Generally, a computer enclosure accommodates a plurality of electronic components therein, such as a hard disk, and a compact disc read-only memory (CD ROM) drive. The longer the electronic components work, the more heat they generate. If the computer enclosure is overheated, the performance and reliability of the computer will suffer, together with slow speed and shortened service life span. Hence, heat dissipation in the computer enclosure is of great importance in computer enclosure design.

BRIEF DESCRIPTION OF THE DRAWINGS

Many aspects of the present computer enclosure can be better understood with reference to the following drawings. The components in the drawings are not necessarily to scale, the emphasis instead being placed upon clearly illustrating the principles of the computer enclosure. Moreover, in the drawings, like reference numerals designate corresponding parts throughout the several views.

DETAILED DESCRIPTION

Figure 1:
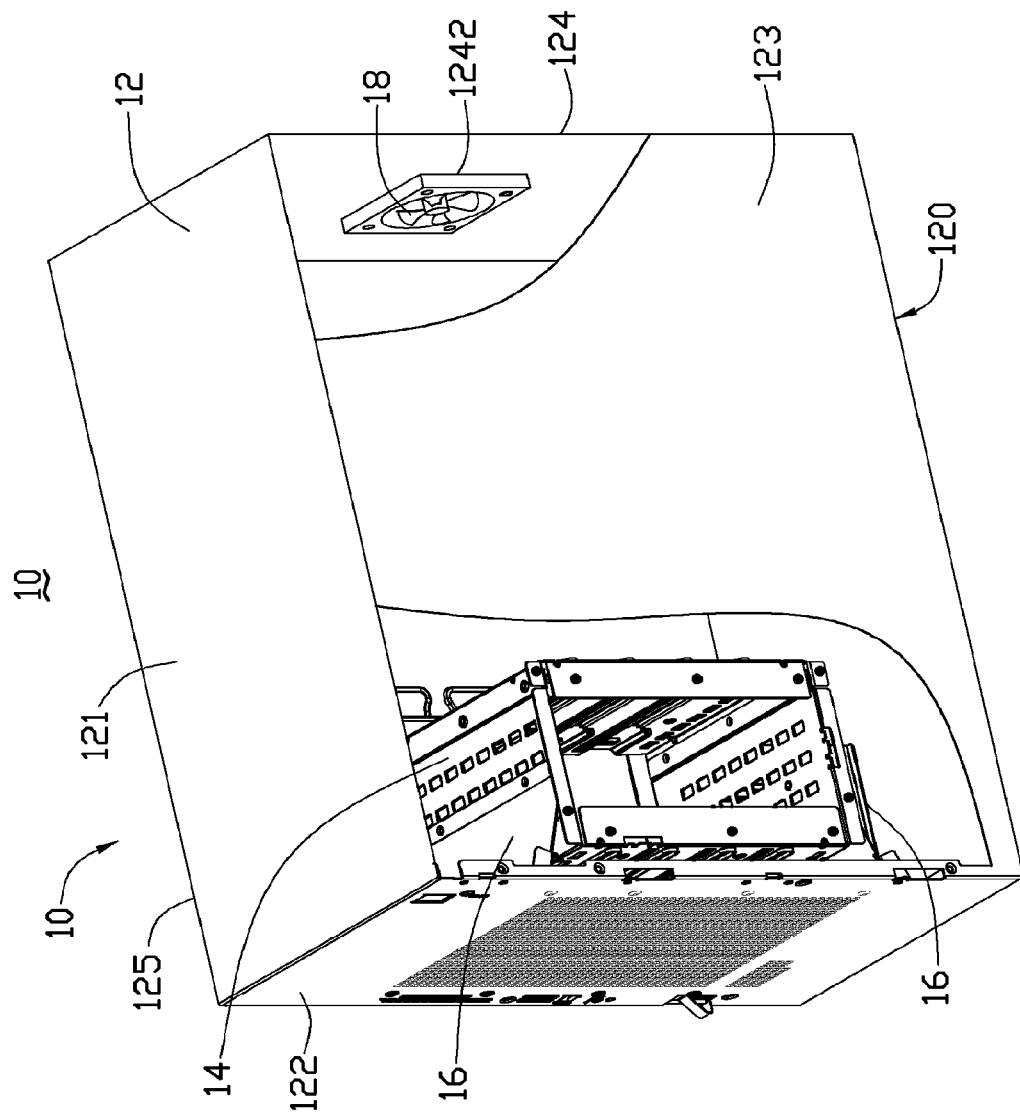
FIG. 1 is a cutaway view of a computer enclosure, according to an exemplary embodiment.

Referring to FIG. 1, a computer enclosure 10, according to an exemplary embodiment, includes a chassis 12, a mounting frame 14, two air-guiding members 16, and an exhaust fan 18.

The chassis 12 is approximately cuboid and includes a bottom panel 120, a top panel 121, a front panel 122, a back panel 124, a left side panel 123, and a right side panel 125. The bottom panel 120 and the top panel 121 are positioned at opposite sides of the chassis 12. The front panel 122, the left side panel 123, the back panel 124, and the right side panel 125 perpendicularly connect the top panel 121 to the bottom panel 120 at four sides of the chassis 12. The front panel 122 is parallel to the back panel 124. The left side panel 123 is parallel to the right side panel 125.

Figure 2:
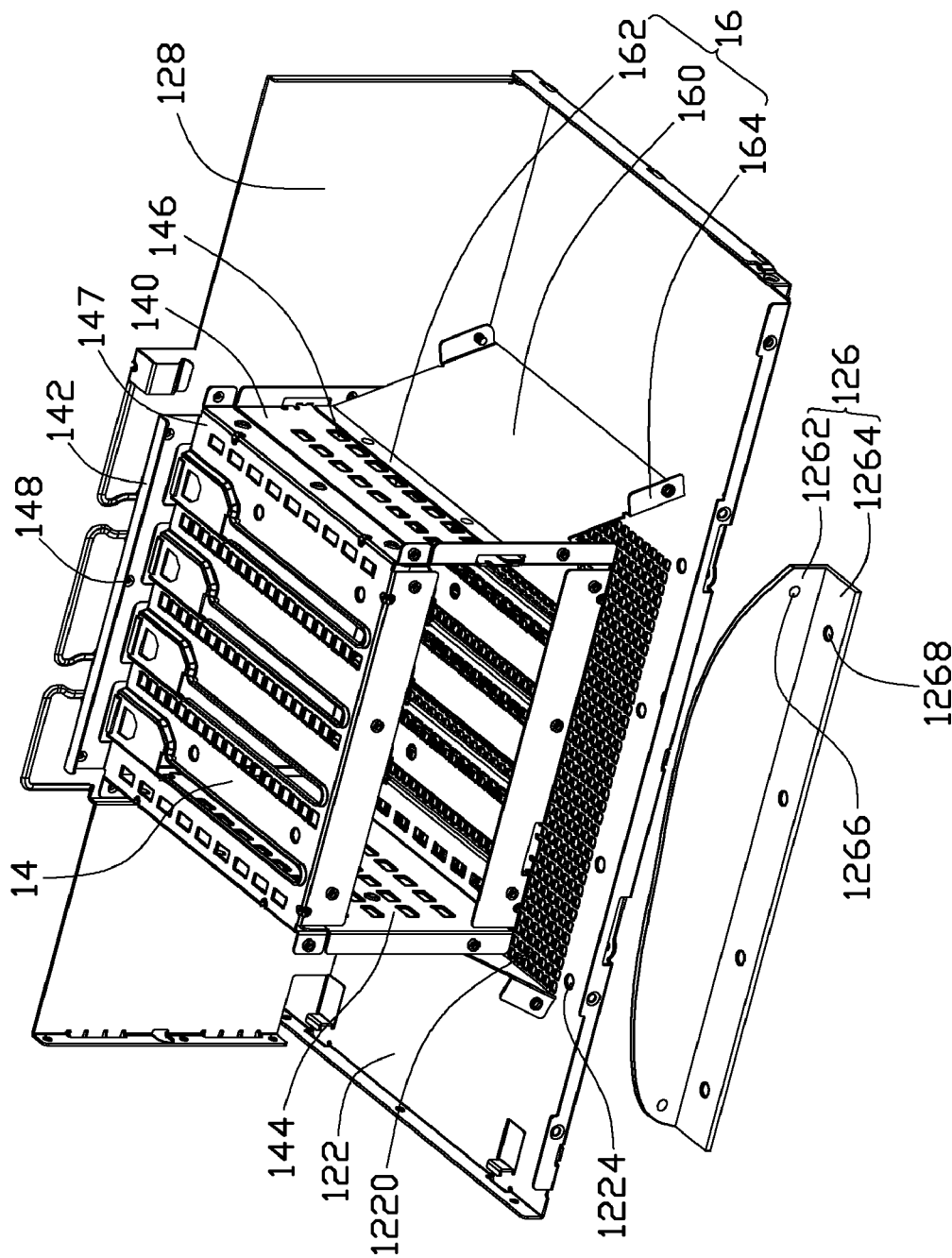
FIG. 2 is a partial, isometric view of the computer enclosure of FIG. 1, but viewed from another angle.
Figure 3:
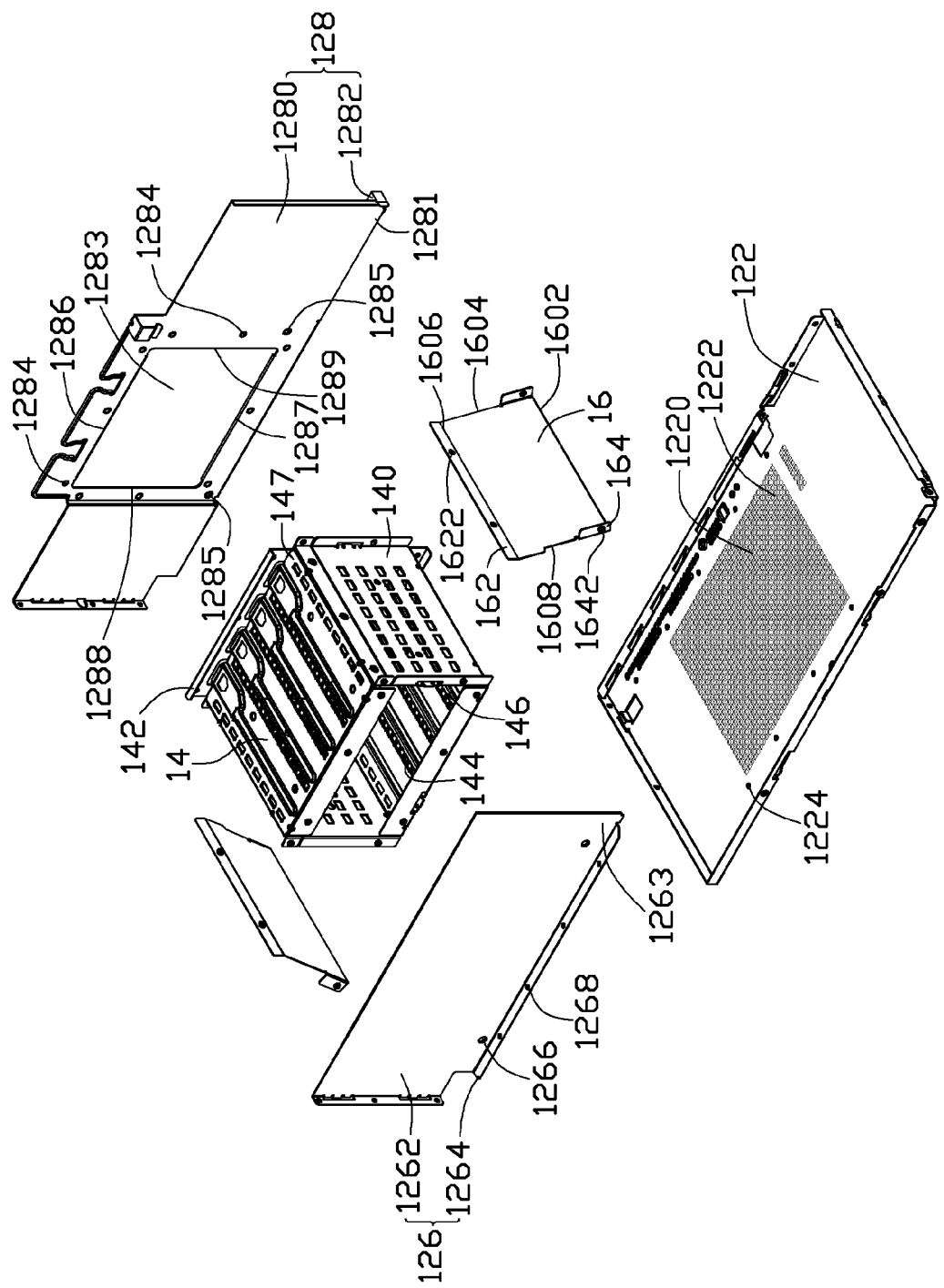
FIG. 3 is an exploded view of the computer enclosure of FIG. 2.

Referring to FIGS. 2-3, the front panel 122 includes a ventilation area 1220. The ventilation area 1220 defines a plurality of ventilation through holes 1222. Eight screw holes 1224 are defined at two opposite sides of the ventilation area 1220. Four screw holes 1224 are at one side of the ventilation area 1220, and the other four screw holes 1224 are at opposite side of the ventilation area 1220.

An air outlet 1242 (shown in FIG. 1) is defined in the back panel 124. The air outlet 1242 communicates with the ventilation through holes 1222.

The computer enclosure 10 further includes a first side panel 126 and a second side panel 128. The first side panel 126 includes a first plate 1262 and a first fixing plate 1264. The first fixing plate 1264 perpendicularly extends from a side 1263 of the first plate 1262 facing the front panel 122. Two first plate holes 1266 are defined in the first plate 1262 adjacent to the first fixing plate 1264. Four first fixing holes 126S are defined in the first fixing plate 1264 corresponding to the four screw holes 1224. Four first bolts (not shown) extend through the first fixing holes 1268 and engage in four screw holes 1224 so that the first side panel 126 is fixed to the front panel 122.

The second side panel 128 includes a second plate 1280 and a second fixing plate 1282. The second fixing plate 1282 perpendicularly extends from a side 1281 of the second plate 1280 facing the front panel 122. The second plate 1280 defines an opening 1283, ten mounting holes 1284, and two second plate holes 1285. The opening 1283 is rectangular. The ten mounting holes 1284 are arranged around the opening 1283. In particular, three mounting holes 1284 are arranged in a line parallel to an upper side 1286 of the opening 1283, three mounting holes 1284 are arranged in a line parallel to a lower side 1287 of the opening 1283, two mounting holes 1284 are arranged in a line parallel to a left side 1288 of the opening 1283, and two mounting holes 1284 are arranged in a line parallel to a right side 1289 of the opening 1283. The two second plate holes 1285 are arranged at two sides 1288, 1289 of the opening 1283 adjacent to the lower side 1287. The second fixing plate 1282 defines four second fixing holes (not visible in figures) corresponding to the four screw holes 1224. Second bolts (not shown) extend through the second fixing holes and engage with the four screw holes 1224 so that the second side panel 128 is fixed to the front panel 122.

The mounting frame 14 is approximately cuboid and includes four sidewalls 140 and four connecting plates 142. The four sidewalls 140 are connected end-to-end to cooperatively define a receiving space 144. The receiving space 144 is configured for receiving a plurality of electronic components, such as a hard disk, and/or a CD ROM driver. A plurality of through holes 146 are defined in the four sidewalls 140 allowing circulation of air. The four connecting plates 142 perpendicularly extend from the four sidewalls 140 at sides 147 of the mounting frame 14 facing the second side panel 128, respectively. Ten connecting holes 148 are defined in the four connecting plates 142 corresponding to the ten mounting holes 1284. Third bolts (not shown) extend through the connecting holes 148 and engage with the second plate holes 1285 so that the mounting frame 14 is fixed to the second side panel 128. After assembling the mounting frame 14, the mounting frame 14 faces the ventilation area 1220, and the receiving space 144 communicates with the opening 1283 and the ventilation through holes 1222. In this embodiment, an area of the sidewall 140 facing the front panel 122 is smaller than that of the ventilation area 1220.

The two air-guiding members 16 are positioned at two opposite sides of the mounting frame 14 to form an air passage. Therefore, the two air-guiding members 16 cooperatively form a funnel-shaped air passage. The air passage gradually decrease away from the ventilation area 1220. Each air-guiding member 16 includes a rectangular-shaped guiding plate 160, a third fixing plate 162, and two fourth fixing plates 164. The guiding plate 160 includes a first side 1602, a second side 1604, a third side 1606, and a fourth side 1608 connecting end to end. The first side 1602 is parallel to the third side 1606. The second side 1604 is parallel to the fourth side 1608. The third fixing plate 162 extends from the third side 1606 and inclines relative to the guiding plate 160. Two third fixing holes 1622 are defined in each third fixing plate 162. The two fourth fixing plates 164 extend from the second side 1604 and the fourth side 1608 respectively. A fourth fixing hole 1642 is defined in each fourth fixing plate 164. Fourth bolts (not shown) extend through the third fixing holes 1622 and engage with the corresponding through holes 146.

Fifth bolts (not shown) extend through the first plate holes 1266 and engage with the corresponding fourth fixing holes 1642. Sixth bolts (not shown) extend through the second plate holes 1285 and engage with the corresponding fourth fixing holes 1642. Therefore, the two air-guiding members 16 are assembled to the mounting frame 14. The first sides 1602 abut the front panel 122. The third fixing plates 162 are attached to the sidewalls 140 of the mounting frame 14.

The exhaust fan 18 is fixed to the back panel 124 and faces the air outlet 1242. In this embodiment, the exhaust fan 18 is fixed to the back panel 124 by screwing. In other embodiments, the exhaust fan 18 may be glued or welded to the back panel 124.

When the exhaust fan 18 is activated, air from the ventilation through holes 1222 is guided by the two air-guiding members 16 to flow into the mounting frame 14 through the through holes 146. Thus, heat generated by the electronic components received in the mounting frame 14 is taken away, and is exhausted by the exhaust fan 18 from the air outlet 1242. The electronic components are cooled accordingly. In this way, heat generated in the chassis 12 can be efficiently dissipated.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A computer enclosure comprising:
    a chassis comprising a bottom panel, a top panel, a front panel, a back panel parallel to the front panel, a left side panel, and a right side panel parallel to the left side panel, a ventilation area defined in the front panel, the bottom panel and the top panel being positioned at opposite sides of the chassis, and the front panel, the left side panel, the back panel, and the right side panel connecting the top panel to the bottom panel at respective four sides of the chassis, the ventilation area defining a plurality of ventilation through holes, and an air outlet being defined in the back panel and facing the ventilation area; eight screw holes being defined on the front panel, wherein four screw holes are positioned at one side of the ventilation area, and the other four screw holes are positioned at an opposite side of the ventilation area;
    a first side panel;
    a second side panel;
    a mounting frame fixed to the chassis and facing the ventilation through holes, the mounting frame configured for receiving electronic components;
    two air-guiding members respectively connecting two opposite sides of the mounting frame to the chassis, the two air-guiding members inclining relative to the mounting frame and the chassis to form an air passage; and
    a fan configured for exhausting air passing through the ventilation through holes and the mounting frame, the fan being fixed to the back panel and covering the air outlet;
    wherein the first side panel comprises a first plate and a first fixing plate, the first fixing plate perpendicularly extends from a side of the first plate, two first plate holes are defined in the first plate adjacent to the side of the first plate, four first fixing holes are defined in the first fixing plate corresponding to the four screw holes of the one side of the ventilation area, and four first bolts extend through the first fixing holes and engage in the four screw holes of the one side of the ventilation area so that the first side panel is fixed to the front panel.

2. The computer enclosure as claimed in claim 1, wherein the fan is an exhaust fan.

3. The computer enclosure as claimed in claim 1, wherein the second side panel is fixed to the front panel by screwing.

4. The computer enclosure as claimed in claim 3, wherein the second side panel comprises a second plate and a second fixing plate, the second fixing plate perpendicularly extends from a side of the second plate, two second plate holes are defined in the second plate adjacent to the side of the first plate, four second fixing holes are defined in the second fixing plate, and four second bolts extend through the second fixing holes and engage in the four screw holes of the opposite side of the ventilation area so that the second side panel is fixed to the front panel.

5. The computer enclosure as claimed in claim 4, wherein the mounting frame is fixed to the second side panel by screwing.

6. The computer enclosure as claimed in claim 5, wherein each air-guiding member comprises a guiding plate, a third fixing plate, and two fourth fixing plates; each of the guiding plates comprise a first side, a second side a third side, and a fourth side connected end to end, the first side is parallel to the third side, and the second side is parallel to the fourth side; the third fixing plate extends from the third side and inclines relative to the guiding plate, the two fourth fixing plates extend from the second side and the fourth side respectively; and the third fixing plate is fixed to the mounting frame, and the two fourth fixing plates are fixed to the first side panel and the second side panel, respectively.

7. The computer enclosure as claimed in claim 6, wherein a plurality of through holes are defined in the four sidewalls of the mounting frame to allow circulation of air, two third fixing holes are defined in the third fixing plate, a fourth fixing hole is defined in each fourth fixing plate, two third bolts pass through the third fixing holes and engage in the corresponding, through holes of the mounting frame, two fourth bolts pass through the two first plate holes and engage in the fourth fixing holes of the two fourth fixing plates at the fourth sides of the guiding plates of the two air-guiding members, and two fifth bolts pass through the two second plate holes and engage in the fourth fixing holes of the two fourth fixing plates at the second sides of the guiding plates of the two air-guiding members.

8. The computer enclosure as claimed in claim 7, wherein a size of the air passage gradually decreases in a direction away from the ventilation area.

9. A computer enclosure comprising:
    a chassis comprising a front panel, a back panel parallel to the front panel, and a ventilation area defined in the front panel, an air outlet being defined in the back panel and facing the ventilation area, and the ventilation area defining a plurality of ventilation through holes;
    a plurality of screw portions being defined at two opposite sides of the ventilation area on the front panel, half of the plurality of screw portions being positioned at one side of the ventilation area, and the other half of the plurality of screw portions being positioned at an opposite side of the ventilation area;
    a mounting frame fixed to the chassis and comprising four sidewalls, the four sidewalls connected end-to-end to cooperatively define a receiving space, the receiving space configured for receiving electronic components, and a plurality of through holes being defined in the four sidewalls to allow circulation of air;

a first side panel;

a second side panel;

a fan being fixed to the back panel and covering the air outlet, the fan configured for exhausting air passing through the ventilation through holes and the mounting frame; and two air-guiding members respectively connecting two opposite sidewalls of the mounting frame to the front panel of the chassis, the two air-guiding members inclining relative to the mounting frame and the chassis to form an air passage;

wherein the first side panel and the second side panel are respectively fixed to the two opposite sides of the ventilation area by the plurality of screw portions, the mounting frame is positioned between the first and second side panels and allows the other two opposite sidewalls of the mounting frame to face the ventilation area and the fan, respectively, and the two air-guiding members, the first side panel and the second side panel cooperatively surround the ventilation area to allow the air to enter the chassis from the ventilation area and allow the air to pass through the mounting frame.

10. The computer enclosure as claimed in claim 9, wherein the chassis is approximately cuboid, and further comprises a bottom panel, a top panel, a left side panel, and a right side panel, the bottom panel and the top panel are positioned at opposite sides of the chassis, the front panel, the left side panel, the back panel, and the right side panel connect the top panel to the bottom panel at respective four sides of the chassis, and the left side panel is parallel to the right side panel.

11. The computer enclosure as claimed in claim 9, wherein the fan is an exhaust fan.

12. The computer enclosure as claimed in claim 9, wherein the plurality of screw portions are eight screw holes, four screw holes are positioned at the one side of the ventilation area, and the other four screw holes are positioned at the opposite side of the ventilation area.

13. The computer enclosure as claimed in claim 12, wherein the first side panel is fixed to the front panel by screwing.

14. The computer enclosure as claimed in claim 13, wherein the first side panel comprises a first plate and a first fixing plate, the first fixing plate perpendicularly extends from a side of the first plate, two first plate holes are defined in the first plate adjacent to the side of the first plate, four first fixing holes are defined in the first fixing plate corresponding to the four screw holes of the one side of the ventilation area, and four first bolts extend through the first fixing holes and engage in the four screw holes of the one side of the ventilation area so that the first side panel is fixed to the front panel.

15. The computer enclosure as claimed in claim 14, wherein the second side panel is fixed to the front panel by screwing.

16. The computer enclosure as claimed in claim 15, wherein the second side panel comprises a second plate and a second fixing plate, the second fixing plate perpendicularly extends from a side of the second plate, two second plate holes are defined in the second plate adjacent to the side of the second plate, four second fixing holes are defined in the second fixing plate, and four second bolts extend through the second fixing holes and engage in the four screw holes of the opposite side of the ventilation area so that the second side panel is fixed to the front panel.

17. The computer enclosure as claimed in claim 16, wherein the mounting frame is fixed to the second side panel by screwing.

18. The computer enclosure as claimed in claim 17, wherein each air-guiding member comprises a guiding plate, a third fixing plate, and two fourth fixing plates; each of the guiding plates comprise a first side, a second side, a third side, and a fourth side connected end to end, the first side is parallel to the third side, and the second side is parallel to the fourth side; the third fixing plate extends from the third side and inclines relative to the guiding plate, and the two fourth fixing plates extend from the second side and the fourth side respectively; and the third fixing plate is fixed to the mounting frame, and the two fourth fixing plates are fixed to the first side panel and the second side panel, respectively.

19. The computer enclosure as claimed in claim 18, wherein two third fixing holes are defined in the third fixing plate, a fourth fixing hole is defined in each fourth fixing plate, two third bolts pass through the third fixing holes and engage in the corresponding through holes of the mounting frame, two fourth bolts pass through the two first plate holes and engage in the fourth fixing holes of the two fourth fixing plates at the fourth sides of the guiding plates of the two air-guiding members, and two fifth bolts pass through the two second plate holes and engage in the fourth fixing holes of the two fourth fixing plates at the second sides of the guiding plates of the two air-guiding members.

20. The computer enclosure as claimed in claim 19, wherein a size of the air passage gradually decreases in a direction away from the ventilation area.

* * * * *